US010509246B2

United States Patent
Zhang et al.

(10) Patent No.: US 10,509,246 B2
(45) Date of Patent: Dec. 17, 2019

(54) DISPLAY PANEL AND DRIVING AND MANUFACTURING METHOD THEREOF, AND DISPLAY DEVICE

(71) Applicant: BOE TECHNOLOGY GROUP CO., LTD., Beijing (CN)

(72) Inventors: Xiao Zhang, Beijing (CN); Pengxia Liang, Beijing (CN); Kang Guo, Beijing (CN); Xin Gu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 94 days.

(21) Appl. No.: 15/568,167

(22) PCT Filed: May 19, 2017

(86) PCT No.: PCT/CN2017/084987
§ 371 (c)(1),
(2) Date: Oct. 20, 2017

(87) PCT Pub. No.: WO2018/076669
PCT Pub. Date: May 3, 2018

(65) Prior Publication Data
US 2018/0299715 A1   Oct. 18, 2018

(30) Foreign Application Priority Data

Oct. 31, 2016   (CN) .......................... 2016 1 0929102

(51) Int. Cl.
G02F 1/133 (2006.01)
G02F 1/1343 (2006.01)
G02F 1/1335 (2006.01)
(52) U.S. Cl.
CPC .... *G02F 1/13306* (2013.01); *G02F 1/134309* (2013.01); *G02F 1/133512* (2013.01); *G02F 1/133514* (2013.01); *G02F 2203/023* (2013.01)

(58) Field of Classification Search
CPC ............... G02F 1/315; G02F 2203/023; G02F 1/133553
See application file for complete search history.

(56) References Cited

U.S. PATENT DOCUMENTS 5,486,940 A * 1/1996 Fergason ............. G02B 5/3016
349/122
5,973,727 A 10/1999 McGrew et al.
(Continued)

FOREIGN PATENT DOCUMENTS

CN 1206218 A 1/1999
CN 102645790 A 8/2012
(Continued)

OTHER PUBLICATIONS

International Search Report of PCT/CN2017/084987 in Chinese, dated Aug. 16, 2017 with English translation.
(Continued)

*Primary Examiner* — Alexander P Gross
(74) *Attorney, Agent, or Firm* — Collard & Roe, P.C.

(57) ABSTRACT

A display panel and a driving method and manufacturing method thereof, and a display device. The display panel includes a base substrate, a dielectric layer provided on the base substrate, and a refractive index variable layer provided on a side of the dielectric layer away from the base substrate; the refractive index variable layer is in contact with the dielectric layer and has a contact surface with the dielectric layer, and the refractive index variable layer can change the refractive index so that the light entering from the light incident side is totally reflected or transmitted at the contact surface.

13 Claims, 2 Drawing Sheets

(56) References Cited

U.S. PATENT DOCUMENTS

| | | | | |
|---|---|---|---|---|
| 6,287,649 | B1* | 9/2001 | Fukushima | B82Y 30/00 349/123 |
| 2007/0252928 | A1* | 11/2007 | Ito | G02F 1/1362 349/106 |
| 2007/0296909 | A1 | 12/2007 | Nagato et al. | |
| 2016/0139478 | A1* | 5/2016 | Whitehead | G02F 1/167 359/222.1 |
| 2016/0147128 | A1 | 5/2016 | Loxley et al. | |

FOREIGN PATENT DOCUMENTS

| | | | |
|---|---|---|---|
| CN | 103018931 | A | 4/2013 |
| CN | 105474085 | A | 4/2016 |
| CN | 105911691 | A | 8/2016 |
| CN | 106324868 | A | 1/2017 |
| CN | 206115085 | U | 4/2017 |
| EP | 2 743 756 | A1 | 6/2014 |
| JP | 2000-171813 | A | 6/2000 |
| JP | 2002-357802 | A | 12/2002 |

OTHER PUBLICATIONS

Notice of Transmittal of the International Search Report of PCT/CN2017/084987 in Chinese, dated Aug. 16, 2017.

Written Opinion of the International Searching Authority of PCT/CN2017/084987 in Chinese, dated Aug. 16, 2017 with English translation.

Chinese Search Report in Chinese Application No. 201610929102.0 dated Feb. 22, 2017 with English translation.

First Chinese Office Action in Chinese Application No. 201610929102.0 dated Apr. 24, 2017 with English translation.

Second Chinese Office Action in Chinese Application No. 201610929102.0 dated Jul. 31, 2017 with English translation.

* cited by examiner

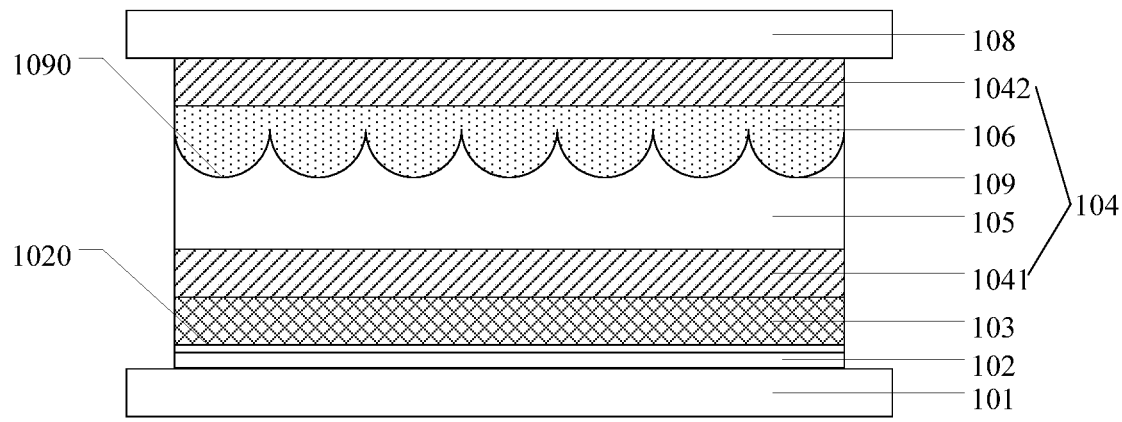

FIG. 4

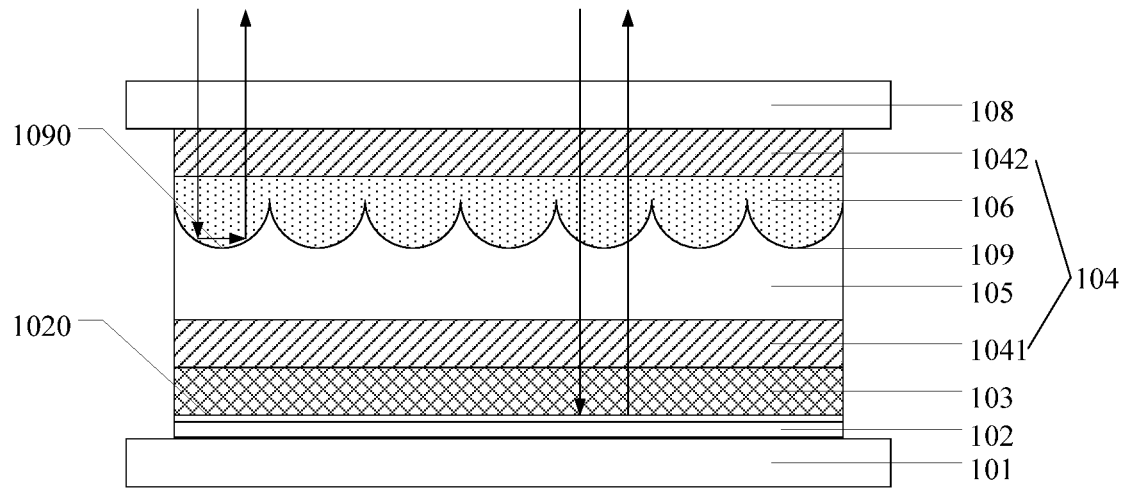

FIG. 5

| changing the refractive index of the refractive index variable layer to be greater than the refractive index of the dielectric layer so that the light entering from the light incident side is totally reflected at the contact surface, thereby displaying a bright state on the side where the refractive index variable layer is located | S301 |

↓

| changing the refractive index of the refractive index variable layer to be the same or substantially the same as the refractive index of the dielectric layer so that the light entering from the light incident side is transmitted at the contact surface, thereby displaying a dark state on the side where the refractive index variable layer is located | S302 |

FIG. 6

DISPLAY PANEL AND DRIVING AND MANUFACTURING METHOD THEREOF, AND DISPLAY DEVICE

CROSS REFERENCE TO RELATED APPLICATIONS

This application is the National Stage of PCT/CN2017/084987 filed on May 19, 2017, which claims priority under 35 U.S.C. § 119 of Chinese Application No. 201610929102.0 filed on Oct. 31, 2016, the disclosure of which is incorporated by reference.

TECHNICAL FIELD

Embodiments of the present disclosure relate to a display panel and a driving method and a manufacturing method thereof, and a display device.

BACKGROUND

With the continuous development of display technology, reflective display devices are applied in display areas such as e-book readers, billboards, display boxes and the like due to their advantages such as low power consumption, low cost, small visual fatigue and so on. Therefore, much attention has been given to the development of reflective display devices.

Total reflection phenomenon means that when light emits from an optically denser medium to an optically thinner medium, the refraction angle will be greater than the incident angle. When the refraction angle is greater than or equal to 90 degrees, no refraction light appears in the optically thinner medium. Moreover, the incident angle corresponding to the refraction angle of 90 degrees is defined as the critical angle.

SUMMARY

Embodiments of the present disclosure provide a display panel and a driving method and a manufacturing method thereof, and a display device. The display panel comprises a base substrate, a dielectric layer provided on the base substrate, and a refractive index variable layer provided on a side of the dielectric layer away from the base substrate; the refractive index variable layer is in contact with the dielectric layer and has a contact surface with the dielectric layer, the side of the refractive index variable layer away from the base substrate is a light incident side, and the refractive index variable layer can change the refractive index so that the light entering from the light incident side is totally reflected or transmitted at the contact surface. Thus, the display panel can provide a novel reflective display panel without black particles, thereby avoiding problems such as agglomeration of particles.

At least an embodiment of the present disclosure provides a display panel, comprising: a base substrate; a dielectric layer disposed on the base substrate; and a refractive index variable layer disposed on a side of the dielectric layer away from the base substrate; a side of the refractive index variable layer away from the base substrate is a light incident side; the refractive index variable layer is in contact with the dielectric layer and has a contact surface with the dielectric layer, and the refractive index variable layer is configured to change a refractive index thereof so that light entering from the light incident side is totally reflected or transmitted at the contact surface.

For example, the display panel of an embodiment of the disclosure further comprises: a color filter layer disposed on a side of the dielectric layer away from the refractive index variable layer; the color filter layer includes a black filter and/or a chromatic filter for display.

For example, the display panel of an embodiment of the disclosure further comprises: a reflective layer disposed on a side of the color filter layer away from the dielectric layer.

For example, the display panel of an embodiment of the disclosure further comprises: an electric field providing layer configured to generate an electric field; the refractive index variable layer is configured to change the refractive index under driving of the electric field generated by the electric field providing layer so that the light is totally reflected or transmitted at the contact surface.

For example, in the display panel of an embodiment of the disclosure, the dielectric layer has a refractive index smaller than a maximum refractive index of the refractive index variable layer.

For example, in the display panel of an embodiment of the disclosure, the electric field providing layer is configured to generate a first electric field and a second electric field, and the refractive index of the refractive index variable layer is configured to be greater than the refractive index of the dielectric layer under driving of the first electric field so that the light entering from the light incident side is totally reflected at the contact surface, and is configured to be same or substantially same as the refractive index of the dielectric layer under driving of the second electric field so that the light entering from the light incident side is transmitted at the contact surface.

For example, in the display panel of an embodiment of the disclosure, the electric field providing layer comprises a first electrode disposed on a side of the dielectric layer away from the refractive index variable layer and a second electrode disposed on a side of the refractive index variable layer away from the dielectric layer.

For example, in the display panel of an embodiment of the disclosure, the contact surface between the refractive index variable layer and the dielectric layer comprises a plurality of concave surfaces arranged in an array, each of the concave surfaces being recessed away from the refractive index variable layer.

For example, in the display panel of an embodiment of the disclosure, the concave surfaces comprise hemispherical surfaces.

For example, in the display panel of an embodiment of the disclosure, a material of the refractive index variable layer comprises liquid crystal.

At least an embodiment of the present disclosure provides a display device, comprising the display panel.

At least an embodiment of the present disclosure provides a method of driving a display panel, the display panel comprises a base substrate, a dielectric layer disposed on the base substrate, and a refractive index variable layer disposed on a side of the dielectric layer away from the base substrate, the refractive index variable layer is in contact with the dielectric layer and has a contact surface with the dielectric layer, and a side of the refractive index variable layer away from the base substrate is a light incident side, the method comprises: changing a refractive index of the refractive index variable layer to be greater than a refractive index of the dielectric layer so that light entering from the light incident side is totally reflected at the contact surface; and changing the refractive index of the refractive index variable layer to be same or substantially same as the refractive index of the dielectric layer so that the light entering from the light incident side is transmitted at the contact surface.

For example, in the method of an embodiment of the present disclosure, the display panel further comprises a color filter layer disposed on a side of the dielectric layer away from the refractive index variable layer, a reflective layer disposed on a side of the color filter layer away from the dielectric layer, and an electric field providing layer, the color filter layer comprising a black filter and/or a chromatic filter for display; the method comprises: generating a first electric field by the electric field providing layer to make the refractive index of the refractive index variable layer be greater than the refractive index of the dielectric layer so that the light entering from the light incident side is totally reflected at the contact surface; and generating a second electric field by the electric field providing layer to make the refractive index of the refractive index variable layer be same or substantially same as the refractive index of the dielectric layer so that the light entering from the light incident side is transmitted at the contact surface.

At least an embodiment of the present disclosure provides a method of manufacturing a display panel, comprising: forming a dielectric layer on a base substrate; and forming a refractive index variable layer on a side of the dielectric layer away from the base substrate; the refractive index variable layer is disposed in contact with the dielectric layer and has a contact surface with the dielectric layer, a side of the refractive index variable layer away from the base substrate is a light incident side, and the refractive index variable layer is configured to change a refractive index thereof so that light entering from the light incident side is totally reflected or transmitted at the contact surface.

For example, the method of manufacturing a display panel of an embodiment of the present disclosure further comprises: forming a color filter layer on a side of the dielectric layer away from the refractive index variable layer.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 4 is a schematic view of another display panel according to an embodiment of the present disclosure;

FIG. 5 is a working diagram of a display panel according to an embodiment of the present disclosure; and FIG. 6 is a flow chart of a method of driving a display panel according to an embodiment of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

With the continuous development of display technology and electronic information, the applications of display devices are becoming more and more extensive. Compared with typical liquid crystal display devices or electroluminescent display devices, reflective display devices have small power consumption because they do not need to emit light by themselves or be additionally provided with a backlight source, and thus can be used for a long time period. In addition, reflective display devices have advantages such as no harm to the eye, simple structure, low cost and the like.

Figure 1:
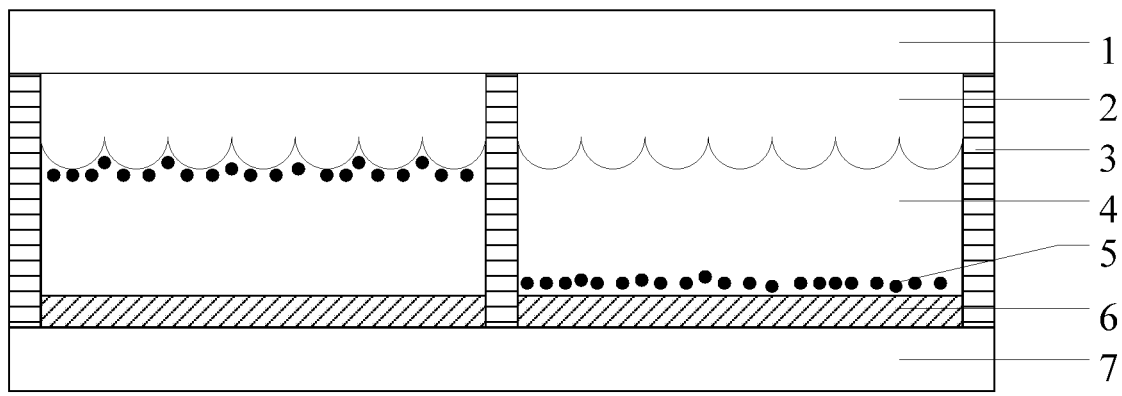
FIG. 1 is a schematic view of a display panel.

FIG. 1 is a reflective display panel by means of total reflection. As illustrated in FIG. 1, the display panel comprises a lower substrate 7, a lower electrode 6, an electrophoretic dielectric layer 4, a hemispherical structure layer 2, post spacers 3, and an upper substrate 1, which are provided sequentially. The electrophoretic dielectric layer 4 is provided with a plurality of black charged particles 5, and the hemispherical structure layer 2 is provided with an electrode layer. Thus, the display panel can use the difference between the reflective indexes of the hemispherical structure layer 2 and the electrophoretic dielectric layer 4 to generate total reflection so as to achieve a bright state, and then uses the movement of the black charged particles 5 toward the hemispherical structure layer 2 under the action of the electric field generated by the electrode layer in the lower electrode 6 and the hemispherical structure layer 2 so as to destroy the total reflection for achieving a black state. However, as illustrated in FIG. 1, the agglomeration of a large number of black charged particles 5 can easily occur due to the action of the electric field or an external force, thereby bringing about various defects.

Embodiments of the present disclosure provide a display panel and a driving method and a manufacturing method thereof, and a display device. The display panel comprises a base substrate, a dielectric layer provided on the base substrate, and a refractive index variable layer provided on a side of the dielectric layer away from the base substrate; the refractive index variable layer is in contact with the dielectric layer and has a contact surface with the dielectric layer, the side of the refractive index variable layer away from the base substrate is a light incident side, and the refractive index variable layer can change the refractive index so that the light entering from the light incident side is totally reflected or transmitted at the contact surface. Thus, the display panel can provide a novel reflective display panel without black particles, thereby avoiding problems such as agglomeration of particles. The display panel can achieve total reflection by using the refractive index difference between the dielectric layer and the refractive index variable layer so as to display a bright state, and destroy the total reflection condition by changing the refractive index of the refractive index variable layer so as to display a dark state.

The display panel and its driving method and manufacturing method as well as the display device provided in the embodiments of the present disclosure will be described below with reference to the accompanying drawings.

First Embodiment

Figure 2:
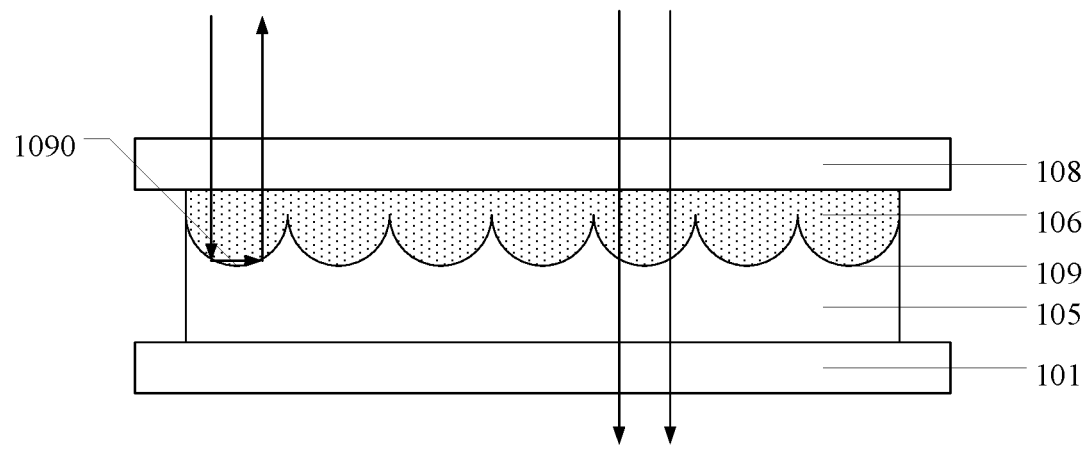
FIG. 2 is a schematic view of a display panel according to an embodiment of the present disclosure.

The present embodiment provides a display panel, comprising a base substrate 101, a dielectric layer 105, and a refractive index variable layer 106, as illustrated in FIG. 2. The dielectric layer 105 is provided on the base substrate 101, and the refractive index variable layer 106 is provided on a side of the dielectric layer 105 away from the base substrate 101. The refractive index variable layer 106 is in contact with the dielectric layer 105 and has a contact surface 109 with the dielectric layer; the side of the refractive index variable layer 106 away from the base substrate 101 is a light incident side; and the refractive index variable layer 106 can change its refractive index so that the light entering from the light incident side is totally reflected or transmitted at the contact surface 109. For example, when light enters from the refractive index variable layer 106, the refractive index of the refractive index variable layer 106 is set as greater than the refractive index of the dielectric layer 105, in which case the light can be totally reflected at the contact surface 109 so that a bright state can be displayed on the side where the refractive index variable layer 106 of the display panel is located; the refractive index of the refractive index variable layer 106 is changed, for example, to be the same as or substantially the same as the refractive index of the dielectric layer 105, to destroy the total reflection conditions, in which case the light can be transmitted at the contact surface 109 so that a dark state can be displayed on the side where the refractive index variable layer 106 of the display panel is located. Apparently, when light enters from the dielectric layer 105, total reflection can be achieved by setting the refractive index of the refractive index variable layer 106 to be smaller than the refractive index of the dielectric layer 105. The embodiments of the present disclosure are not limited to the above cases. It shall be noted that the above-mentioned "contact" means that the dielectric layer 105 and the refractive index variable layer 106 are in direct contact with each other without any other layer structure(s) therebetween. In addition, the external light described above may include ambient light or light generated by other light source devices.

In the present embodiment, the display panel can provide a novel reflective display panel which uses a difference in refractive index between the dielectric layer and the refractive index variable layer to achieve total reflection so as to display a bright state, and which changes the refractive index of the refractive index variable layer to destroy the total reflection condition so as to display a dark state. The display panel can achieve display without a light source additionally provided or without emitting light, thereby reducing the power consumption of the display panel and increasing the lifetime of the display panel. Moreover, the display panel has a small burden on the eye with respect to a display panel which is self-luminous or which uses a backlight source, and is thus suitable for long viewing. In addition, the display panel can avoid agglomeration of black particles because it does not need to be provided with black particles.

For example, in the display panel according to an example of the present embodiment, the contact surface 109 between the refractive index variable layer 106 and the dielectric layer 105 comprises a plurality of concave surfaces 1090 arranged in an array, each of which is recessed away from the refractive index variable layer 106, as illustrated in FIG. 2. For example, the surface of the dielectric layer adjacent to the refractive index variable layer may include a plurality of concave surfaces arranged in an array, each of which is recessed away from the refractive index variable layer so that the contact surface 109 comprises a plurality of concave surfaces 1090. As such, when light emits perpendicularly from the side where the refractive index variable layer is located, the light has a certain angle of incidence on the contact surface 109, and total reflection can be achieved by setting the difference in refractive index between the refractive index variable layer and the dielectric layer to make the above incident angle be greater than or equal to the critical angle.

For example, in the display panel according to an example of the present embodiment, the concave surfaces 1090 each may be a hemispherical surface, as illustrated in FIG. 2. Thus, in addition to the center of the hemisphere, the vertically incident light from the side where the refractive index variable layer is located has a certain angle of incidence, and the hemisphere is a symmetrical shape. When the vertically incident light is irradiated on one side of the hemisphere, the vertically incident light can be totally reflected and irradiated on the other side of the hemisphere so that it can return in the original direction by means of total reflection. As a result, the display panel can improve the display effect of the front surface of the display panel.

For example, in the display panel according to an example of the present embodiment, the material of the refractive index variable layer includes liquid crystal, for example, nematic liquid crystal or cholesteric liquid crystal. Of course, the embodiments of the present disclosure include, but are not limited to, the above mentioned situations and the materials of the refractive index variable layer may also be other refractive index variable material.

Figure 3:
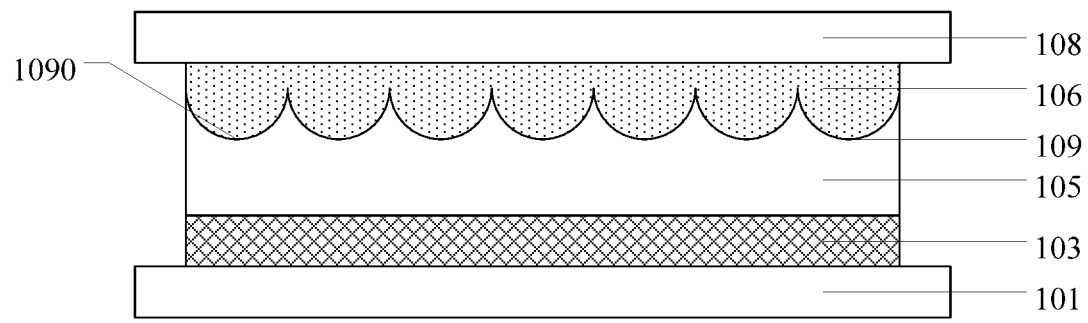
FIG. 3 is a schematic view of another display panel according to an embodiment of the present disclosure.

For example, in the display panel according to an example of the present embodiment, the display panel further comprises a color filter layer 103 disposed on the side of the dielectric layer 105 away from the refractive index variable layer 106, as illustrated in FIG. 3. The color filter layer 103 may comprise at least one color filter for display. Thus, when light enters from the refractive index variable layer 106, the light is totally reflected on the contact surface to display a bright state, and the light is transmitted through the contact surface to be irradiated on the color filter layer 103, thereby displaying the color of the color filter on the color filter layer 103. Therefore, the display panel can display a color. It shall be noted that the color filter can absorb part of the incident light to display the color, and the light not absorbed can be reflected by the color filter so as to be observed by the human eye, for example, red color filter can absorb blue or green light and reflect red light; it is apparent that the embodiments of the present disclosure include, but are not limited to, the above situation and the color filter can absorb part of the incident light and transmit the light not absorbed, and display a color through the reflective layer. For example, the color filter may include any one of a black color filter or a chromatic filter (e.g., a red color filter, a blue color filter, or a green color filter). If the color filter only includes a black color filter, the light irradiated on the color filter layer is fully absorbed to display black. If the color filter includes a chromatic filter, when light is irradiated on the chromatic filter on the color filter layer, the light having the color of the chromatic filter can be reflected to display the color of the chromatic filter, and the light of other colors can be absorbed. Of course, when light is irradiated on the chromatic filter on the color filter layer, the light having the color of the chromatic filter can also be transmitted and a reflective layer is provided to display the color of the chromatic filter, and the embodiments of the present disclosure are not limited to the above cases. It shall be noted that the color filter layer may be in an integral structure having the color of the color filter when the color filter layer includes only one color filter.

For example, in the display panel according to an example of the present embodiment, the display panel further comprises a reflective layer 102 provided on one side of the color filter layer 103 away from the dielectric layer 105, as illustrated in FIG. 4. For example, the reflective layer 102 comprises a reflective surface 1020 provided on one side of the reflective layer 102 adjacent to the color filter layer 103. In this way, the reflective surface 1020 of the reflective layer 102 can reflect the light transmitted from the color filter layer 103 back so as to display the color of the color filter layer 103 on the side where the refractive index variable layer of the display panel is located. For example, the color filter layer 103 includes a red color filter, and when light is irradiated on the red color filter, red light can pass through the red color filter to be irradiated on the reflective layer 102, and be reflected by the reflective surface 1020 back to the side where the refractive index variable layer of the display panel is located.

For example, in the display panel according to an example of the present embodiment, the display panel further includes an electric field providing layer 104 for generating an electric field, as illustrated in FIG. 4. The refractive index variable layer 106 can change the refractive index under the driving of the electric field generated by the electric field providing layer 104 so that light is totally reflected or transmitted at the contact surface 109. Thus, an electric field can be generated by the electric field providing layer 104 to change the refractive index of the refractive index variable layer 106. In this case, the material of the refractive index variable layer may be liquid crystal (nematic liquid crystal or cholesteric liquid crystal). Of course, the refractive index of the refractive index variable layer 106 may be changed by means other than an electric field, and the embodiments of the present disclosure are not limited thereto. For example, the refractive index of the refractive index variable layer 106 can be changed by controlling the temperature, pH, or the like.

For example, the electric field providing layer 104 may generate a first electric field and a second electric field. The refractive index of the refractive index variable layer 106 can be greater than the refractive index of the dielectric layer 105 under the driving of the first electric field so that the light from the refractive index variable layer 106 can be totally reflected at the contact surface 109, and the refractive index of the refractive index variable layer 106 can be the same or substantially the same as the refractive index of the dielectric layer 105 under the driving of the second electric field so that the light from the refractive index variable layer 106 can be transmitted at the contact surface. For example, that the refractive index of the refractive index variable layer is substantially the same as the refractive index of the dielectric layer 105 under the driving of the second electric field means that the difference in refractive index between the refractive index variable layer and the dielectric layer is within 0.05.

For example, in the display panel according to an example of the present embodiment, the refractive index of the dielectric layer is smaller than the maximum refractive index of the refractive index variable layer. Thus, the light entering from the side where the refractive index variable layer is located can be totally reflected at the contact surface.

For example, when the refractive index variable layer is a liquid crystal layer, the refractive index of the liquid crystal layer under the action of the first electric field may range from 1.7 to 2.3, the refractive index under the action of the second electric field may range from 1.3 to 1.5, and the refractive index of the dielectric layer may range from 1.3 to 1.5; when the liquid crystal layer is under the action of the first electric field, the refractive index of the liquid crystal layer is greater than the refractive index of the dielectric layer and the light entering from the light incident side can be totally reflected at the contact surface, and when the liquid crystal layer is under the action of the second electric field, the refractive index of the liquid crystal layer is the same or substantially the same as the refractive index of the dielectric layer and the light entering from the light incident side can be transmitted at the contact surface.

For example, in the display panel according to an example of the present embodiment, the electric field providing layer 104 may include a first electrode 1041 and a second electrode 1042, as illustrated in FIG. 4. An electric field is generated by applying a voltage difference across the first electrode 1041 and the second electrode 1042. It shall be noted that the first electrode may be a pixel electrode and the second electrode may be a common electrode, or the first electrode may be a common electrode and the second electrode may be a pixel electrode. In addition, the electric field providing layer may include a plurality of pixel units, and the pixel electrode may include a plurality of independent sub-pixel electrodes, and the plurality of sub-pixel electrodes are provided in the plurality of pixel units, respectively, so as to generate different electric fields with the common electrode(s) to independently drive the refractive index variable layer corresponding to each pixel unit.

For example, the first electrode and the second electrode may be transparent electrodes, thereby improving the light utilization efficiency of the display panel and increasing the brightness of the display panel.

For example, in the display panel according to an example of the present embodiment, the first electrode 1041 is disposed on the side of the dielectric layer 105 away from the refractive index variable layer 106, and the second electrode 1042 is disposed on the side of the refractive index variable layer 106 away from the dielectric layer 105, as illustrated in FIG. 4. Thus, the electric field providing layer can generate an electric field perpendicular to the base substrate by applying a voltage difference across the first electrode and the second electrode. Of course, the embodiments of the present disclosure include, but are not limited thereto, and the first electrode and the second electrode may also be provided in the same layer and insulated from each other. For example, the first electrode and the second electrode in the same layer may be provided on one side of the dielectric layer 105 away from the refractive index variable layer 106 or on one side of the refractive index variable layer 106 away from the dielectric layer 105. In this case, the electric field providing layer may generate an electric field parallel to the base substrate by applying a voltage difference across the first electrode and the second electrode.

For example, the display panel may further include an upper substrate 108 disposed on the second electrode 1042, as illustrated in FIG. 5. The upper substrate 108 may serve as a carrier for the second electrode 1042, and may also protect the second electrode.

In the display panel according to the present embodiment, when light enters from the upper substrate 108, the light can pass through the upper substrate 108, the second electrode 1042 and the refractive index variable layer 106 to be irradiated on the contact surface 109, as illustrated in FIG. 5. The refractive index of the refractive index variable layer 106 can be changed to be greater than the refractive index of the dielectric layer 105. When light emits from an optically denser medium to an optically thinner medium, total reflection can occur at the contact surface 109, thereby displaying a bright state. The refractive index of the refractive index variable layer 106 can be changed to be the same or substantially the same as the refractive index of the dielectric layer 105 to destroy the total reflection condition. The light passes through the contact surface 109, the dielectric layer 105 and the first electrode 1041 and is irradiated on the color filter layer 103. When the color filter layer 103 includes a chromatic filter, light of some colors is absorbed by the chromatic filter, and part of the light can pass through the chromatic filter and be reflected back through the reflective surface 1020 of the reflective layer 102, thereby displaying color on the side where the refractive index variable layer 106 (upper substrate 108) of the display panel is located.

Second Embodiment

The present embodiment provides a display device, comprising any display panel as described in the first embodiment. Because the display device comprises the display panel according to the first embodiment, the display device has a technical effect corresponding to the technical effect of the display panel included therein. Reference can be made to the first embodiment, and no further detail will be provided in the present embodiment.

For example, the display device may be an e-book reader, a billboard, a display box, or a display instrument.

Third Embodiment

The present embodiment provides a method of driving a display panel, the display panel comprising a base substrate, a dielectric layer disposed on the base substrate, and a refractive index variable layer disposed on one side of the dielectric layer away from the base substrate; the refractive index variable layer is in contact with the dielectric layer and has a contact surface with the dielectric layer, and the side of the refractive index variable layer away from the base substrate is a light incident side, as illustrated in FIG. 6, the method comprising following operations S301-S302.

Step S301: changing the refractive index of the refractive index variable layer to be greater than the refractive index of the dielectric layer so that the light entering from the light incident side is totally reflected at the contact surface, thereby displaying a bright state on the side where the refractive index variable layer is located.

Step S302: changing the refractive index of the refractive index variable layer to be the same or substantially the same as the refractive index of the dielectric layer so that the light entering from the light incident side is transmitted at the contact surface, thereby displaying a dark state on the side where the refractive index variable layer is located.

In the method of driving a display panel according to the present embodiment, the refractive index of the refractive index variable layer can be changed so that light is totally reflected or transmitted at the contact surface, thereby displaying a bright state or a dark state.

For example, in the method according to an example of the present embodiment, the display panel further includes a color filter layer provided on the side of the dielectric layer away from the refractive index variable layer, a reflective layer provided on the side of the color filter layer away from the dielectric layer, and an electric field providing layer; the color filter layer comprises a black filter and/or a chromatic filter for display and the reflective layer comprises a reflective surface adjacent to a side of the color filter layer. The method comprises: generating an electric field by the electric field providing layer to change the refractive index of the refractive index variable layer to be greater than the refractive index of the dielectric layer so that the light entering from the light incident side is totally reflected at the contact surface to thereby display a bright state on the side where the refractive index variable layer is located; and generating an electric field by the electric field providing layer to change the refractive index of the refractive index variable layer to be the same or substantially the same as the refractive index of the dielectric layer so that the light entering from the light incident side is transmitted at the contact surface to thereby display black or color on the side where the refractive index variable layer is located. Thus, the refractive index of the refractive index variable layer can be changed by applying an electric field by the electric field providing layer so that light is totally reflected or transmitted at the contact surface. Furthermore, the display device can display a color image or a black-white image through the color filter layer and the reflective layer.

For example, in the driving method according to an example of the present embodiment, the electric field providing layer includes a first electrode and a second electrode, and the method may include: applying a first voltage difference V1 across the first electrode and the second electrode to generate a first electric field and change the refractive index of the refractive index variable layer to make the refractive index of the refractive index variable layer be greater than the refractive index of the dielectric layer so that the light entering from the refractive index variable layer is totally reflected at the contact surface to thereby display a bright state on the side where the refractive index variable layer is located; and applying a second voltage difference V2 across the first electrode and the second electrode to generate a second electric field and change the refractive index of the refractive index variable layer to make the refractive index of the refractive index variable layer be the same or substantially the same as the refractive index of the dielectric layer so that the light entering from the refractive index variable layer is transmitted at the contact surface to thereby display black or color on the side where the refractive index variable layer is located. Thus, the refractive index of the refractive index variable layer can be changed by applying a voltage difference across the first electrode and the second electrode so that light is totally reflected or transmitted at the contact surface. In addition, since the voltage difference is easy to implement and control and the reaction speed is high, the reaction speed of the display panel can be increased and the application scenarios of the display panel can be increased.

Fourth Embodiment

The present embodiment provides a method of manufacturing a display panel, comprising: forming a dielectric layer on a base substrate; and forming a refractive index variable layer on a side of the dielectric layer away from the base substrate. The refractive index variable layer is in contact with the dielectric layer and has a contact surface with the dielectric layer; a side of the refractive index variable layer away from the base substrate is a light incident side, and the refractive index variable layer can change the refractive index so that the light entering from the light incident side is totally reflected or transmitted at the contact surface.

For example, the manufacturing method according to an example of the present embodiment further comprises: forming a color filter layer on the side of the dielectric layer away from the refractive index variable layer. The color filter layer may include a black filter and/or a chromatic filter.

For example, the manufacturing method according to an example of the present embodiment further comprises: forming a reflective layer on the side of the color filter layer away from the dielectric layer. The reflective layer includes a reflective surface disposed on the side of the reflective layer adjacent to the color filter layer.

For example, the manufacturing method according to an example of the present embodiment further comprises: forming an electric field providing layer. The electric field providing layer may generate an electric field, and the refractive index variable layer may change the refractive index under the driving of the electric field generated by the electric field providing layer so that light is totally reflected or transmitted at the contact surface.

For example, the manufacturing method according to an example of the present embodiment further comprises: forming a reflective layer on a base substrate; forming a color filter layer on the reflective layer; forming a first electrode on the color filter layer; forming a dielectric layer on the first electrode so as to form a first substrate together with the base substrate, the reflective layer, the color filter layer, and the first electrode; forming a second electrode on an upper substrate so as to form a second substrate; assembling the first substrate and the second substrate; and forming a refractive index variable layer between the first substrate and the second substrate. It shall be noted that the first electrode and the second electrode constitute the electric field providing layer.

For example, liquid crystal is injected between the first substrate and the second substrate to form a refractive index variable layer.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. it should understood that, in the case in which a component or element such as a layer, film, area, substrate or the like is referred to be "on" or "under" another component or element, it may be directly on or under the another component or element or a component or element is interposed therebetween.

(3) Without conflict, features in one embodiment or in different embodiments can be combined.

What are described above is related to the illustrative embodiments of the disclosure only and not limitative to the scope of the disclosure; the scopes of the disclosure are defined by the accompanying claims.

The application claims priority to the Chinese patent application No. 201610929102.0, filed Oct. 31, 2016, the entire disclosure of which is incorporated herein by reference as part of the present application.

What is claimed is:

1. A display panel, comprising:
   a base substrate;
   a dielectric layer disposed on the base substrate;
   a refractive index variable layer disposed on a side of the dielectric layer away from the base substrate;
   a color filter layer disposed on a side of the dielectric layer away from the refractive index variable layer; and
   a reflective layer disposed on a side of the color filter layer away from the dielectric layer,
   wherein a side of the refractive index variable layer away from the base substrate is a light incident side; the refractive index variable layer is in contact with the dielectric layer and has a contact surface with the dielectric layer, and the refractive index variable layer is configured to change a refractive index thereof so that light entering from the light incident side is totally reflected or transmitted at the contact surface,
   the color filter layer comprises a black filter and/or a chromatic filter for display.

2. The display panel according to claim 1, wherein the dielectric layer has a refractive index smaller than a maximum refractive index of the refractive index variable layer.

3. The display panel according to claim 1, wherein a material of the refractive index variable layer comprises liquid crystal.

4. A display device, comprising the display panel according to claim 1.

5. The display panel according to claim 1, wherein the contact surface between the refractive index variable layer and the dielectric layer comprises a plurality of concave surfaces arranged in an array, each of the concave surfaces being recessed away from the refractive index variable layer.

6. The display panel according to claim 5, wherein the concave surfaces comprise hemispherical surfaces.

7. The display panel according to claim 1, further comprising:
   an electric field providing layer configured to generate an electric field,
   wherein the refractive index variable layer is configured to change the refractive index under driving of the electric field generated by the electric field providing layer so that the light is totally reflected or transmitted at the contact surface.

8. The display panel according to claim 7, wherein the electric field providing layer is configured to generate a first electric field and a second electric field, and
   the refractive index of the refractive index variable layer is configured to be greater than a refractive index of the dielectric layer under driving of the first electric field so that the light entering from the light incident side is totally reflected at the contact surface, and is configured to be same or substantially same as the refractive index of the dielectric layer under driving of the second electric field so that the light entering from the light incident side is transmitted at the contact surface.

9. The display panel according to claim 7, wherein the electric field providing layer comprises a first electrode disposed on the side of the dielectric layer away from the refractive index variable layer and a second electrode disposed on a side of the refractive index variable layer away from the dielectric layer.

10. The display panel according to claim 7, wherein the contact surface between the refractive index variable layer and the dielectric layer comprises a plurality of concave surfaces arranged in an array, each of the concave surfaces being recessed away from the refractive index variable layer.

11. The display panel according to claim 7, wherein a material of the refractive index variable layer comprises liquid crystal.

12. A method of driving a display panel, wherein the display panel comprises a base substrate, a dielectric layer disposed on the base substrate, a refractive index variable layer disposed on a side of the dielectric layer away from the base substrate, a color filter layer disposed on a side of the dielectric layer away from the refractive index variable layer, a reflective layer disposed on a side of the color filter layer away from the dielectric layer, and an electric field providing layer, the refractive index variable layer is in contact with the dielectric layer and has a contact surface with the dielectric layer, and a side of the refractive index variable layer away from the base substrate is a light incident side, the color filter layer comprising a black filter and/or a chromatic filter for display, the method comprising:

generating a first electric field by the electric field providing layer to make the refractive index of the refractive index variable layer be greater than the refractive index of the dielectric layer so that the light entering from the light incident side is totally reflected at the contact surface; and generating a second electric field by the electric field providing layer to make the refractive index of the refractive index variable layer be same or substantially same as the refractive index of the dielectric layer so that the light entering from the light incident side is transmitted at the contact surface.

13. A method of manufacturing a display panel, comprising:

forming a dielectric layer on a base substrate;

forming a refractive index variable layer on a side of the dielectric layer away from the base substrate;

forming a color filter layer on a side of the dielectric layer away from the refractive index variable layer; and forming a reflective layer disposed on a side of the color filter layer away from the dielectric layer, wherein the refractive index variable layer is disposed in contact with the dielectric layer and has a contact surface with the dielectric layer, a side of the refractive index variable layer away from the base substrate is a light incident side, and the refractive index variable layer is configured to change a refractive index thereof so that light entering from the light incident side is totally reflected or transmitted at the contact surface, the color filter layer comprises a black filter and/or a chromatic filter for display.

* * * * *